United States Patent
Tang (10) Patent No.: US 10,025,388 B2
(45) Date of Patent: Jul. 17, 2018

(54) TOUCHLESS HUMAN MACHINE INTERFACE

(75) Inventor: Leung Yu Tang, Palatine, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 169 days.

(21) Appl. No.: 13/024,392

(22) Filed: Feb. 10, 2011

(65) Prior Publication Data

US 2012/0207345 A1    Aug. 16, 2012

(51) Int. Cl.
| | |
|---|---|
| G06F 3/01 | (2006.01) |
| G06F 3/044 | (2006.01) |
| G06K 9/00 | (2006.01) |
| B60R 1/00 | (2006.01) |
| B60K 37/06 | (2006.01) |

(52) U.S. Cl.
CPC .............. *G06F 3/017* (2013.01); *B60K 37/06* (2013.01); *B60R 1/00* (2013.01); *G06F 3/044* (2013.01); *G06K 9/00087* (2013.01); *B60K 2350/1004* (2013.01); *B60K 2350/1052* (2013.01); *B60K 2350/2013* (2013.01); *B60K 2350/962* (2013.01)

(58) Field of Classification Search
CPC ........ G06F 3/011; G06F 3/017; G06F 3/0488; G06F 3/0425; G06F 21/32; G06F 3/005; G06F 2203/04101; G06F 3/04883; G06K 9/00375; G06K 9/00033; G06K 9/00355; G06K 9/00335; G06T 7/20; G06T 7/285
USPC ............................ 382/124; 715/863; 345/175
See application file for complete search history.

(56) References Cited

U.S. PATENT DOCUMENTS

| | | | | |
|---|---|---|---|---|
| 5,914,748 | A * | 6/1999 | Parulski et al. ............... | 348/239 |
| 6,256,033 | B1 | 7/2001 | Nguyen | |
| 6,603,462 | B2 * | 8/2003 | Matusis ................ | G06F 3/0219 340/5.83 |
| 6,624,833 | B1 | 9/2003 | Kumar et al. | |
| 7,068,842 | B2 * | 6/2006 | Liang et al. .................. | 382/181 |
| 7,457,425 | B2 * | 11/2008 | Fincham ....................... | 381/302 |
| 7,654,425 | B2 * | 2/2010 | Huang et al. ................. | 224/483 |
| 8,086,971 | B2 * | 12/2011 | Radivojevic et al. ........ | 715/863 |
| 8,230,367 | B2 * | 7/2012 | Bell et al. ..................... | 715/863 |
| 8,344,849 | B2 * | 1/2013 | Larsson .................. | B60R 25/25 340/426.11 |
| 8,400,398 | B2 * | 3/2013 | Schoen et al. ................ | 345/156 |
| 8,620,024 | B2 * | 12/2013 | Huang .................... | G06F 3/017 348/169 |
| 8,793,621 | B2 * | 7/2014 | Boillot .................. | G06F 3/0346 715/863 |
| 2006/0190836 | A1 * | 8/2006 | Ling Su et al. .............. | 715/773 |
| 2007/0038059 | A1 * | 2/2007 | Sheffer et al. ................ | 600/407 |

(Continued)

OTHER PUBLICATIONS

Ulhaas et al., Finger tracking for interaction in augmented environments, Oct. 29-30, 2001 [retrieved Nov. 16, 2015], Proceedings IEEE and ACM International Symposium on Augmented Reality, 2001, pp. 1-10. Retrieved from the Internet: http://ieeexplore.ieee.org/xpls/abs_all.jsp?arnumber=970515.*

(Continued)

*Primary Examiner* — Andrew Moyer
*Assistant Examiner* — Dennis Rosario (57) ABSTRACT

A system and method for receiving input from a user is provided. The system includes at least one camera configured to receive an image of a hand of the user and a controller configured to analyze the image and issue a command based on the analysis of the image.

19 Claims, 7 Drawing Sheets

(56) References Cited

U.S. PATENT DOCUMENTS

| | | | |
|---|---|---|---|
| 2007/0195997 A1 | 8/2007 | Paul et al. | |
| 2008/0170776 A1 | 7/2008 | Albertson et al. | |
| 2009/0058598 A1* | 3/2009 | Sanchez Sanchez et al. | 340/5.83 |
| 2009/0167682 A1* | 7/2009 | Yamashita | G01C 21/36 345/158 |
| 2009/0278915 A1 | 11/2009 | Kramer et al. | |
| 2011/0050562 A1* | 3/2011 | Schoen et al. | 345/156 |
| 2011/0107272 A1* | 5/2011 | Aguilar | 715/853 |
| 2012/0169671 A1* | 7/2012 | Yasutake | G06F 3/0425 345/175 |

OTHER PUBLICATIONS

Piuri et al., Fingerprint Biometrics via Low-cost Sensors and Webcams, Sep. 29, 2008-Oct. 1, 2008 [retrieved Jul. 20, 2016], 2008 2nd IEEE International Conference on Biometrics: Theory, Applications and Systems, 6 pages total. Retrieved from the Internet: http://ieeexplore.ieee.org/xpls/abs_all.jsp?arnumber=4699379&tag=1.*

Parziale et al., Advances in Biometrics: The Surround ImagerTM:A Multi-camera Touchless Device to Acquire 3D Rolled-Equivalent Fingerprints, Jan. 5-7, 2006 [retrieved Dec. 22, 2016], International Conference on Biometrics, LNCS vol. 3832, pp. 244-250. Retrieved from the Internet: http://link.springer.com/chapter/10.1007/11608288_33.*

Piccardi, Background subtractraction techniques:a review, Oct. 10-13, 2004 [retrieved Dec. 22, 2016], 2004 IEEE International Conference on Systems, Man and Cybernetics, pp. 3099-3104. Retrieved from the Internet: http://ieeexplore.ieee.org/document/1400815/.*

Oka et al., Real-Time Fingertip Tracking and Gesture Recognition, Dec. 10, 2002 [retrieved Mar. 3, 2018], IEEE Computer Graphics and Applications, vol. 22, Issue: 6,pp. 64-71. Retrieved from the Internet: http://ieeexplore.ieee.org/abstract/document/1046630/.*

International Search Report and Written Opinion dated May 10, 2012, from corresponding International Patent Application No. PCT/US2012/022149.

\* cited by examiner

TOUCHLESS HUMAN MACHINE INTERFACE

BACKGROUND

1. Field of the Invention

The present invention generally relates to a user interface.

2. Description of Related Art

With the introduction of touch screen technology, users are more comfortable with user interfaces that accept input based on touch interaction with the user. However, a touch screen technology can still be expensive and limits the input to motion that actually contacts the device. In an automotive environment, where a user is confined by a seatbelt, it may not always be convenient to touch the device to provide input.

In view of the above, it is apparent that there is a need for an improved user interface.

SUMMARY

A system and method for receiving input from a user is provided. The system includes at least one camera configured to receive an image of a hand of the user and a controller configured to analyze the image and issue a command based on the analysis of the image.

Camera technology may be used in the vehicle to accept user input while not require the user to physically touch the device. The user may make a hand gesture with their hand within the field of view of the camera. Based on the position and orientation of the user's fingers or the finger path over time, the system can identify the gesture based on a plurality of stored gesture models. Further, the cameras may be configured with resolution sufficient to distinguish a finger print on the fingers. The finger print may be used for tracking the position and orientation of the finger, as well as, for a security check allowing certain features of the user interface to be unlocked. The security check may be for setting option parameters or for even starting the car ignition.

Further objects, features and advantages of this invention will become readily apparent to persons skilled in the art after a review of the following description, with reference to the drawings and claims that are appended to and form a part of this specification.

DETAILED DESCRIPTION

Figure 1:
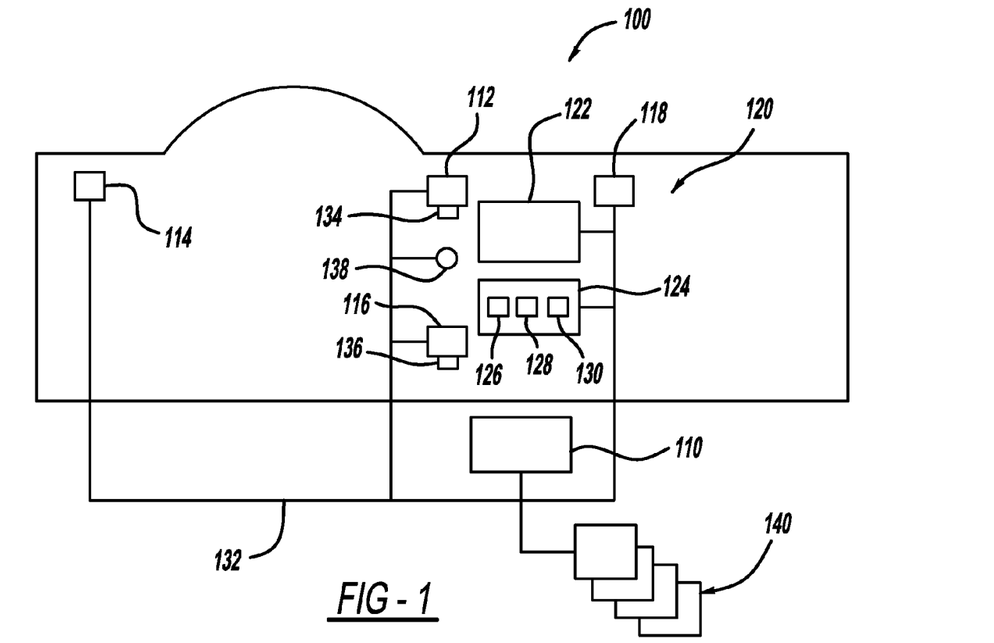
FIG. 1 is a front view of a system for accepting user input.

Now referring to FIG. 1, a system 100 is provided for receiving user input. The system 100 includes a controller 110 and a plurality of cameras 112, 114, 116, 118. The system 100 may also include a display 122 and input controls 124. The cameras 112, 114, 116, 118 may be mounted on a front console 120 of a vehicle. The cameras may include a detector with an array of photosensitive elements. In one example, a CMOS camera may be used. Further, a high definition camera may be used and configured to identify detailed features in the image. For example, if a hand is presented to the camera, the camera may be configured with a resolution high enough to distinguish lines on the pad of the finger that comprise a finger print.

The cameras may be located at different positions along the width of the front console as denoted for example, by cameras 112, 114, 118. The cameras may also be mounted at different heights as denoted by cameras 112, 116. Further, the cameras may be clustered around the center of the console as shown by cameras 112, 116, 118. In one example, cameras 112, 116, 118 are located around the outside of the display 122 on the front console 120. Further, the cameras are located in the center of the console and are accessible by either the driver of the vehicle or front seat passenger of the vehicle.

The display 122 may be a light emitting diode (LED) display, liquid crystal display (LCD), or other display appropriate for automotive applications. Further, input controls 124 may be provided for receiving user input by the controller 110. The controls 124 may include one or more buttons 126, knobs 128, or switches 130 to facilitate providing user input to the controller 110. Although it is also understood that other known physical controls may be provided within the context of the controls 124.

As such, the controller 110, the display 122, the controls 124, and the cameras 112, 114, 116, 118 may all be in communication with one another or for example, a communication bus 132. Although it is also understood that the communications may be multiple separate communication links between each individual device, or a wireless communication link may also be provided between one or more of the above referenced devices.

Figure 2:
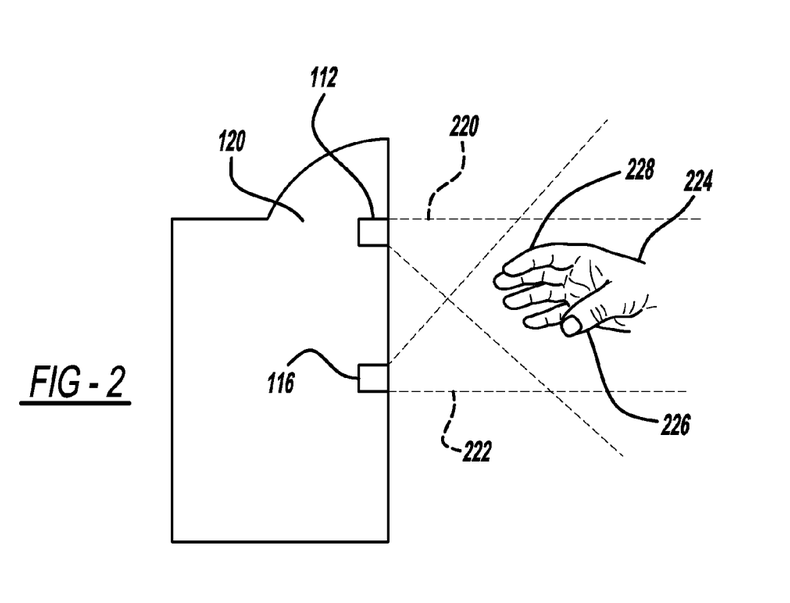
FIG. 2 is a side view of the system for accepting user input in FIG. 1.

The cameras 112, 114, 116, 118 may be configured to view a hand of the user to receive user input. Accordingly, the cameras may capture an image of the hand of the user and further the image of the hand of the user may be displayed on the display 122. By locating the cameras near the display 122, the user can view the image of the hand provided on the display 122, as well as, the user's actual hand. Viewing the image and the hand simultaneously will aid the user in forming gestures that can be understood as user input by the system 100. The controller 110 may also display graphics overlaid on the image of the hand to aid in forming recognizable hand gestures and/or communicate the controller's interpretation of the hand gesture. Further, the cameras 112, 114, 116, 118 may have overlapping fields of use such that multiple of the cameras are viewing the hand at the same time. This can also be seen in the side view provided in FIG. 2. Accordingly, the field of view 220 of the camera 112 overlaps with the field of view 222 of camera 116 such that both cameras view a hand 224 of the user simultaneously and from different vantage points. By using two cameras that view the hand 224 from different vantage points, various stereo vision techniques can be used to determine the location of the hand and orientation of the hand in three dimensional space, as well as, the position and location of fingers 228 and 226 on the hand 224. Using successive images taken by the cameras, allows motion of the hand, as well as, motion of individual fingers to be identified and interpreted as a gesture by the controller 110. Upon interpreting a gesture, the controller 110 may then issue a command to one or more vehicle systems as denoted by reference numeral 140. The vehicle systems may include climate control systems, entertainment systems, door lock systems, lighting systems, or other well known systems.

Further, lights 134, 136 may be provided, for example on the front console, to illuminate the hand during night driving conditions or when ambient illumination is not sufficient for the functioning of the system 100. In one example, the lights 134, 136 are associated with particular cameras 112 and 116. However, in other implementations, the lighting may be provided at a central location and provided independent of any of the cameras particularly. The lights 134, 136 may be LED illumination, and further, the lights 134, 136 may provide illumination in the near infrared spectrum. As such the illumination may not be visible to the user, however, the illumination could be readily sensed by the cameras. In addition, a sensor 138 such as a photo detector may be used to determine if the ambient lighting of a vehicle is above a certain threshold level and as such, may provide a signal to activate the lights 134, 136. The sensor 138 may have one or more photodiodes located at one or more positions within the vehicle to determine the directionality of the ambient light and as such the controller 110 may light a subset of the lights based on the directionality of the ambient light sensed by the sensor 138 to provide even illumination of the hand to the system 100.

Figure 3:
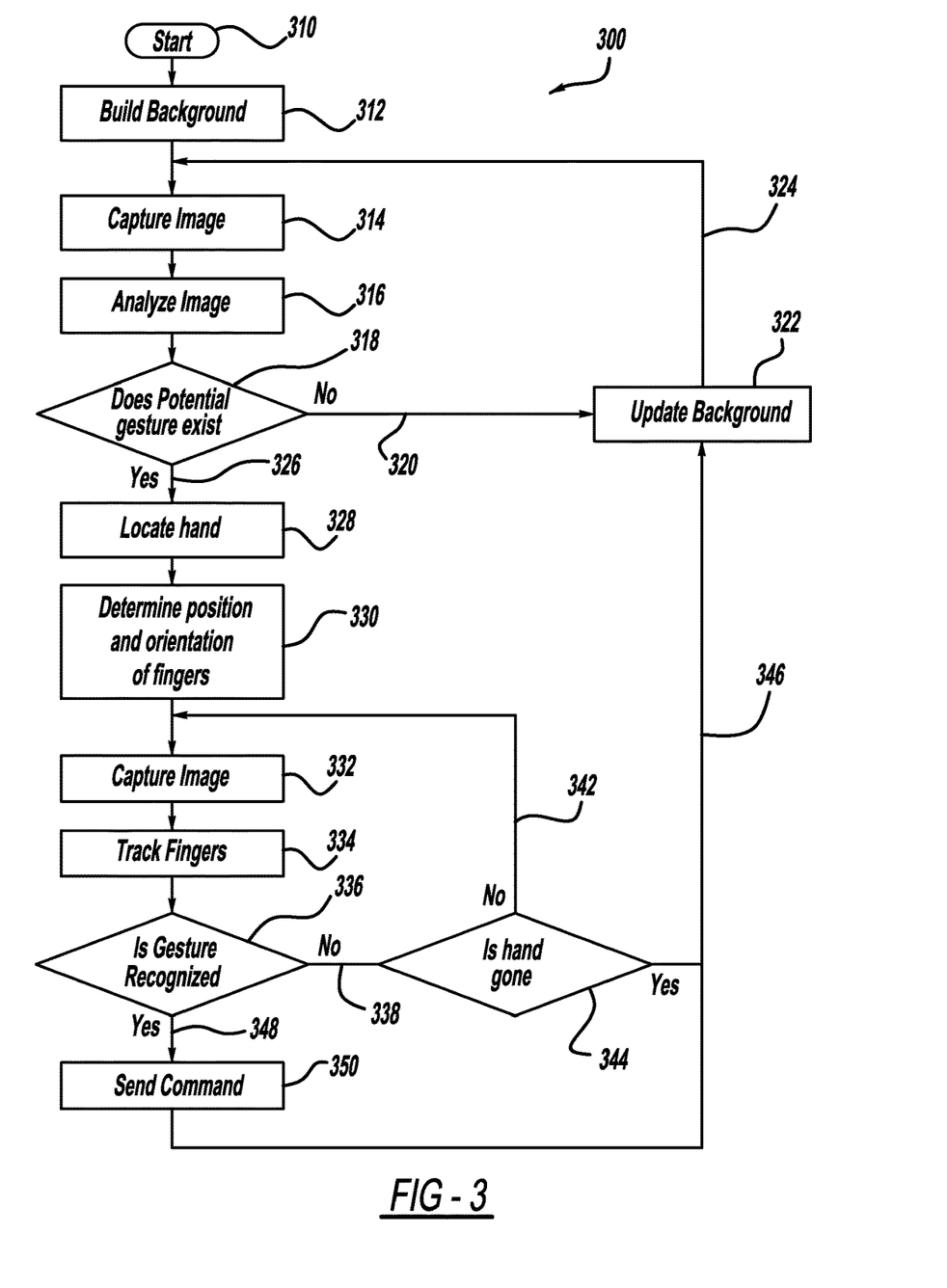
FIG. 3 is a flowchart illustrating a method for accepting user input.

Now referring to FIG. 3, a method for providing user input is illustrated. The method starts in block 310. In block 312, a background image is formed by averaging a series of background images. This may be accomplished by acquiring many images over a period of time and averaging the results of the series of background images. In one implementation, the background image may include a rolling series of images such that a stored background image is the average of a series of background images over a given time period, for example, the last hour. By using a rolling window of background images, the changing lighting conditions in the vehicle may be accounted for as well as other environmental changes. In block 314, an image is captured by the camera where multiple cameras are used, for example, to determine the three dimensional position and orientation of the hand and/or fingers of the user, then multiple images may be captured such as one image for each camera.

In block 316, each image is analyzed. The system may determine if the hand is present in the image by comparing the recently acquired image to the background image. For example, the background image may be subtracted from the recently captured image to provide a difference image. The difference image may be thresholded and an analysis of the resulting shapes may identify if the shapes contained in the image correspond to the shape of a hand. This may be done by various methods which may be as simple as a pixel count, or as complicated as scoring a model of a representative hand and comparing the shapes and the image to the representative model to determine the likelihood that a hand exists in the image. In another example, a stored pattern of the finger print of one or more of the fingers may be used to identify the hand. If the system does not determine that a hand exists in the image, the method follows line 320 to block 322. In block 322, the background series of images is updated and a new background image is stored. The method then follows line 324 to block 314, where the method continues. If the hand is in the image and a potential gesture exists, then the method follows line 326 to block 328. In block 328, the hand is located in the image space and/or in three dimensional space using images from multiple cameras. In block 330, the position and orientation of each of the fingers may be determined. Accordingly, each finger may be first identified in the image space and then a position of the orientation of the finger determined based on images from multiple cameras using triangulation and other stereo imaging techniques to determine the three dimensional position and orientation of each finger. For example, various models may be used to determine the position and orientation of the fingers including a model of the finger print for each finger. In block 332, another image is captured by one or more of the cameras to image the hand. The fingers are tracked in block 334. The fingers may be tracked by utilizing the same steps described above with respect to blocks 328 and 330. In addition, the system may use the position and orientation of the fingers in the previous set of images as a starting point and determine the change in position and orientation of the fingers relative to the previous series images. Accordingly, the system may determine a three dimensional finger path for each finger and match one or more of the finger paths to a predetermined model of finger paths that represents a gesture. In block 336, a system determines if a gesture is recognized, for example, based on the plurality of finger paths. If a gesture is not recognized in block 336, the method follows line 338 to block 340. In block 340, the system determines if the hand has been removed from the image. If the hand has not been removed from the image, the method follows line 342 to block 332 where the method continues. If the hand has been removed from the image in block 340, the method follows line 346 to block 332. In block 332, the background image is updated and stored and the method follows line 324 to block 314, where the method continues.

Now referring again to block 336, if in block 336 the gesture is recognized based on the positions and orientations of the fingers, or more particularly based on the plurality of finger paths, the method follows 348 to block 350. In block 350, the system sends a command that is associated with the recognized gesture to a vehicle subsystem. For example, a gesture where each of the fingers are moved toward one another may cause the controller to send a command to the vehicle entertainment system to change the volume of the vehicle. Another example, the thumb and pinky may be extended from a closed fist and as such, the vaulted position of the pinky and thumb to the rest of the fingers may indicate a gesture to initiate a phone call based only on the positioning orientation of the fingers relative to one another. Accordingly, the system may send a command to initiate a phone call to a telematics controller.

Figure 4:
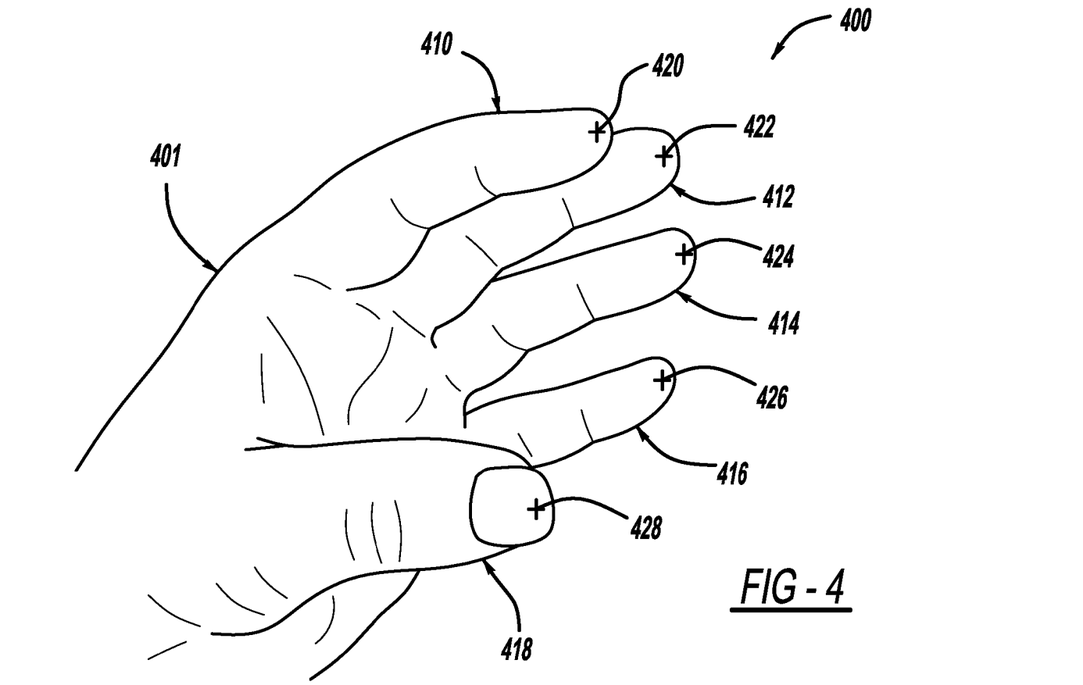
FIG. 4. Is illustration of an image received by a first camera for accepting user input.

Now referring to FIG. 4, image 400 from one camera is provided. The image 400 includes a hand 401 within the field of view of the camera. An index finger is denoted by arrow 410 and various image processing techniques may be used to determine the location of the index finger within the image as denoted by reference numeral 420. Similarly, arrow 412 denotes a middle finger, arrow 414 denotes a ring finger, and arrow 416 denotes a pinky finger and the system may use various image processing techniques to determine the locations of such fingers including a middle finger position 422, a ring finger position 424, and a pinky finger position 426. Further, the thumb is denoted by arrow 418 and the thumb position is denoted by reference number 428.

It is further noted that while the two dimensional positions of the fingers can be determined in two dimensional image space, the components of multiple images from different cameras may be used to determine the three dimensional positions and orientations of each of the fingers through various stereo imaging processing techniques.

Figure 5:
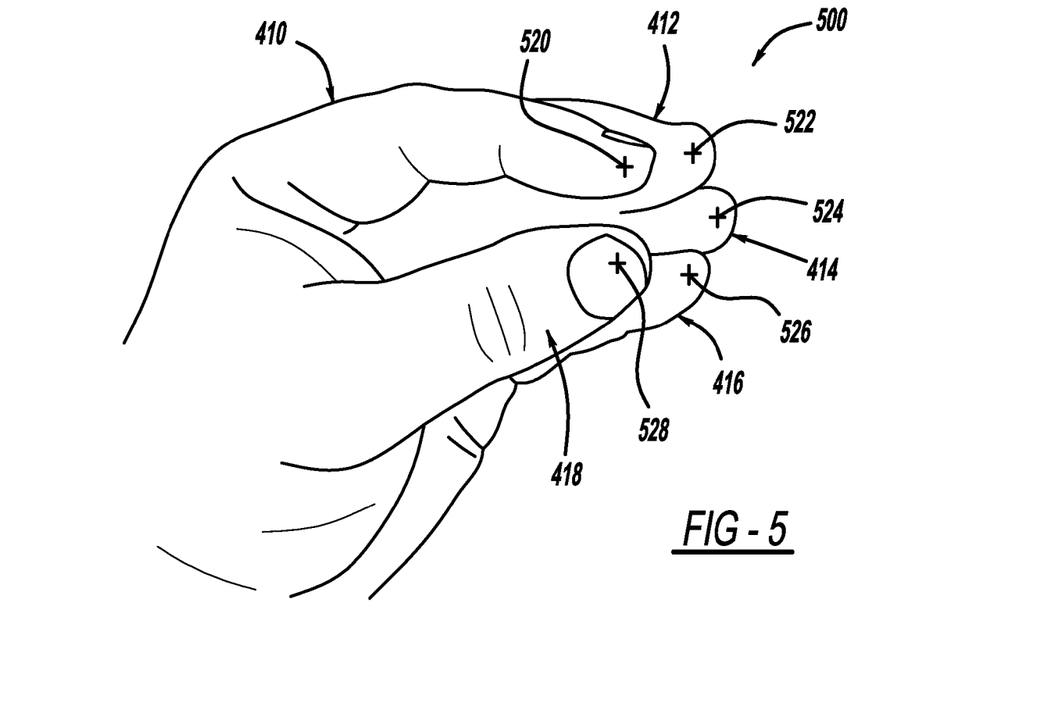
FIG. 5. Is illustration of a subsequent image received by the first camera for accepting user input.

Now referring to FIG. 5, a subsequent image 500 from the same camera as FIG. 4 is provided. In FIG. 5, again the system may identify each of the fingers on the hand 401. For example, the index finger 410, the middle finger 412, the ring finger 414, the pinky finger 416 and the thumb 418. Further, a second position for each of the fingers can be determined in the subsequent image in particular, an index finger position 502, a middle finger position 522, a ring finger position 524, a pink finger position 526, and a thumb position 528 are shown within the image.

Figure 6:
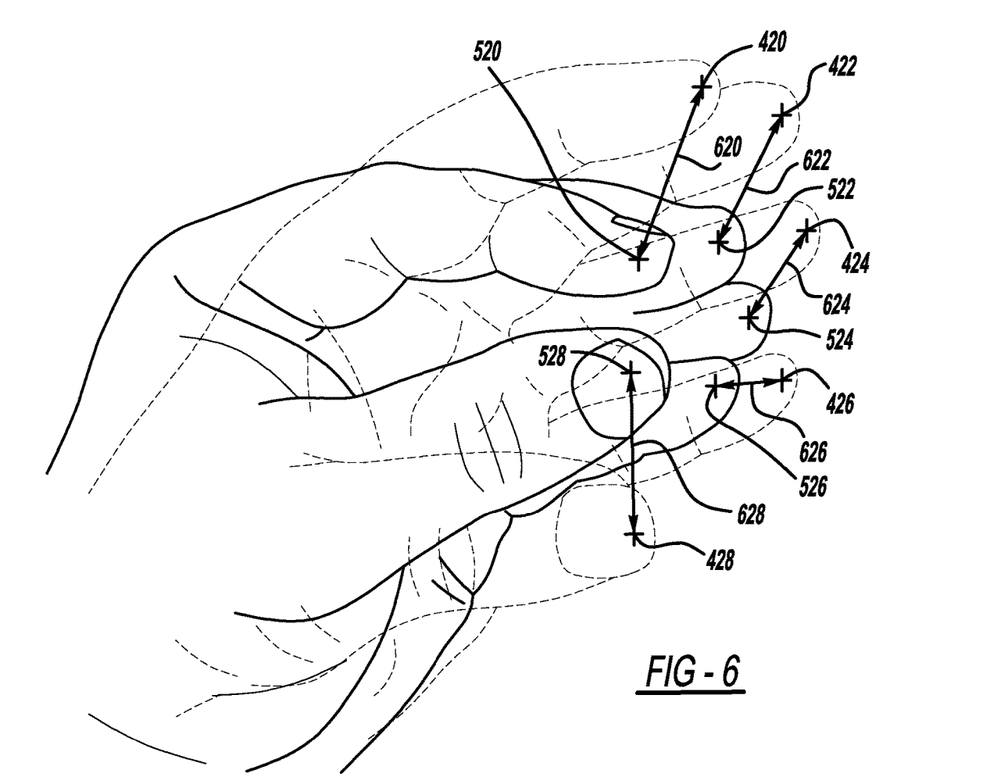
FIG. 6. Is illustration of the finger path and gesture formed by the user in FIG. 4 and FIG. 5.

Now referring to FIG. 6, a superimposed image of FIG. 4 and FIG. 5 is provided showing the initial finger positions 420, 422, 424, 426, 428 and the subsequent finger positions 520, 522, 524, 526, 528. The difference between the finger positions can be calculated in two dimensional or three dimensional space. The change in the finger positions from the initial finger position to the subsequent finger position can be used to calculate a finger path denoted by line 620. While line 620 represents an index finger path, the same process may be used for each of the fingers thereby creating a middle finger path 622, a ring finger path 624, a pinky finger path 626 and a thumb finger path 628. As illustrated in FIG. 6, the fingers were moved from a more open spread position to a close together pinched position. For example, this gesture imitates a person grasping a knob or squeezing an object. The system may interpret the gesture as making something smaller, for example, the volume, or may interpret this combination of finger paths as grasping a knob, for example, to change a radio station and a subsequent rotating of the finger positions while grasping as an indication of turning a representative knob to a higher or lower station. In addition, the system may determine whether the user input is provided by the driver of the vehicle or the passenger of a vehicle based on which hand (right hand or left hand) is presented to the camera. Further, if a very high resolution camera is used, it may be possible to image the fingerprint of one or more of the fingers and determine the location of the fingers based on a matching of a stored fingerprint within the field of the view of the camera. In this scenario, the fingerprint matching may also be used to identify each of the fingers on the hand as well as which user is providing input to the system. Further, the fingerprints may be used to provide access to certain features or unlock certain functions of the car using the fingerprint scan as a security feature.

Figure 7:
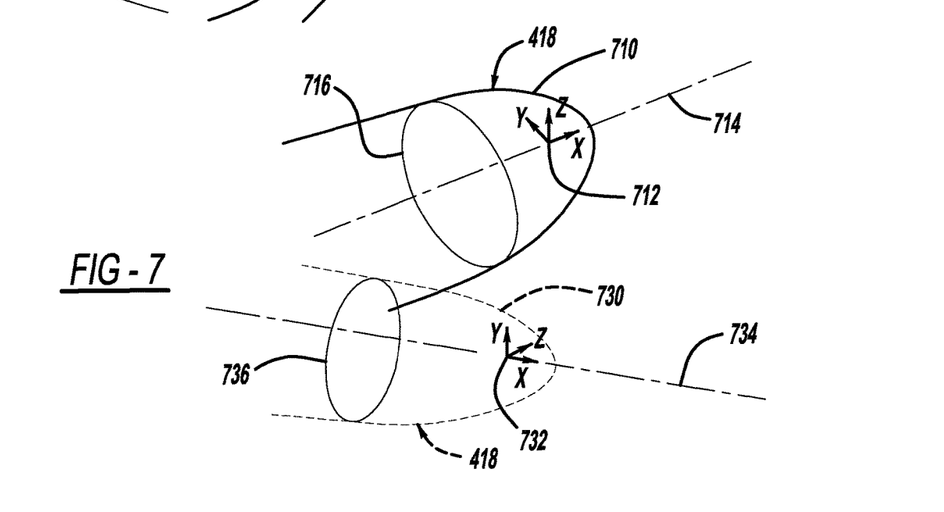
FIG. 7 Is illustration of the change in position and orientation of the thumb from FIG. 6.

Now referring to FIG. 7, one example is provided where the system determines the position and orientation of one or more of the fingers based on a model that is matched to the finger. In this implementation, the initial and subsequent images may again be used to determine a finger path, as well as, a set of positions and orientations of each finger in three dimensional space. Again, this may also be done using stereo vision techniques and also using multiple sets of sequential images for multiple cameras. In this example, an initial position and orientation of a finger may be determined as denoted by reference numeral 712. A diameter of the finger 710 or change in diameter may be used to determine a model of the finger as denoted by axis 714 and geometry 716. The model may include just a position and principle axis 714 or may also include a geometric model as denoted by shape 716 including a cylindrical model or a more complex three dimensional model. In a subsequent image, again a second position and orientation of the finger may be determined as denoted by reference numeral 732. Again, an outline of the finger 730 in the subsequent image may be used to determine an axis 734 and model 736 for the finger in the subsequent image. Accordingly, the gesture may be determined based on both the initial position and orientation and subsequent position and orientations in a set of sequential images for each camera to determine a gesture based on such three dimensional position and orientation information, as well as, contiguous finger path information.

Figure 8:
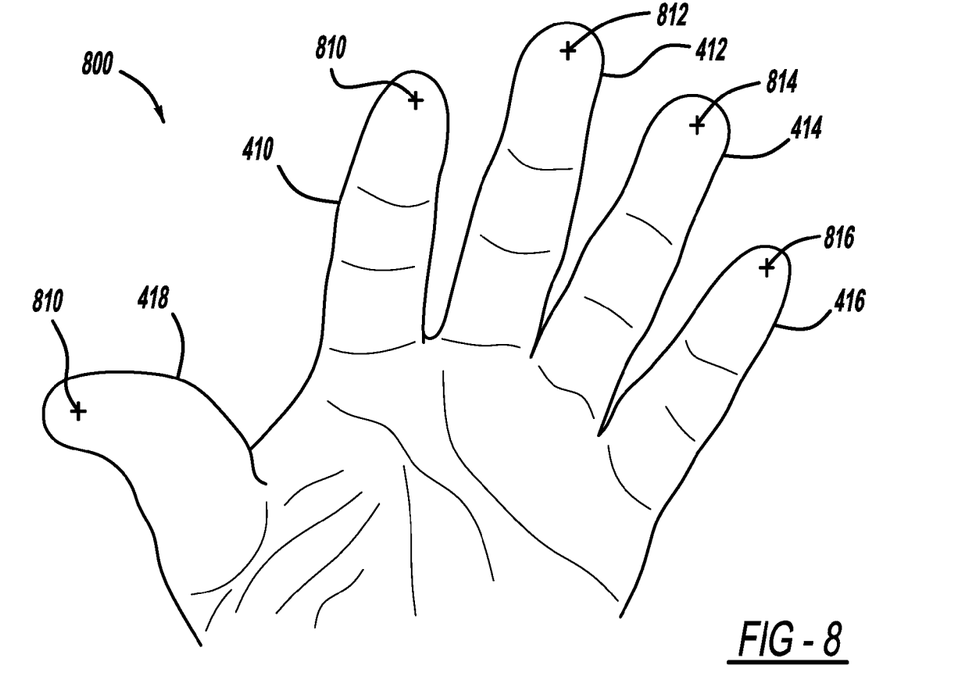
FIG. 8 Is illustration of an image received by a second camera for accepting user input.
Figure 9:
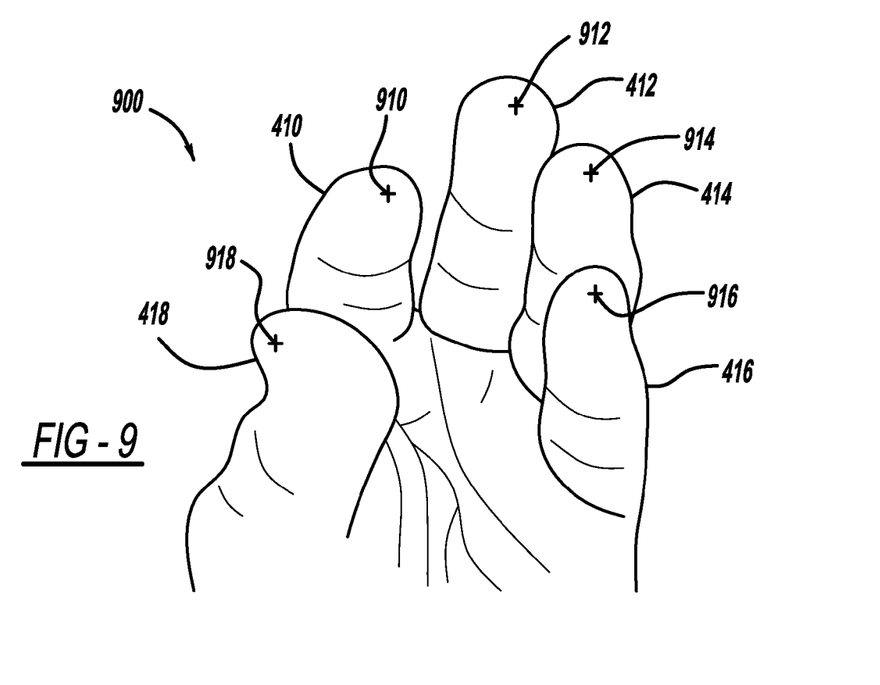
FIG. 9. Is illustration of a subsequent image received by the second camera for accepting user input.

Now referring to FIG. 8-9, a second set of sequential images is provided from another camera which may be used in combination with the first set of images 4-5 from the first camera. The features of the first set of images can be combined with the features of the second set of images using triangulation or stereo vision techniques to determine the set of three dimensional positions and orientations of each finger in three dimensional space, as well as, three dimensional finger paths for each finger which may be used in combination to identify a gesture and issue a corresponding command.

Now referring to FIG. 8, again the index finger 410, the middle finger 412, the ring finger 414, the pinky finger 416, and the thumb 418 are identified and an index finger position 810, a middle finger position 812, a ring finger position 814, a pinky finger position 816, and a thumb position 818 are determined based on the image 800. Further, image 800 is provided from a different position and angle than images 400 and 500 from the first camera to facilitate various triangulation and stereo imaging techniques to determine the position of and orientation of each finger in three dimensional space using a combination of images taken from different cameras at the same time. In addition, the fingers in image 800 are presented with the pads of the fingers presented to the camera. As discussed previously, the finger print from each finger may also be used to identify the location and orientation of each finger.

Now referring to FIG. 9, a subsequent image 900 is provided from the same camera that acquired image 800 and also at the same subsequent time as image 500. Again, the system determines a position of each finger, specifically an index finger position 910, a middle finger position 912, a ring finger position 914, a pinky finger position 916, and a thumb position 918.

Figure 10:
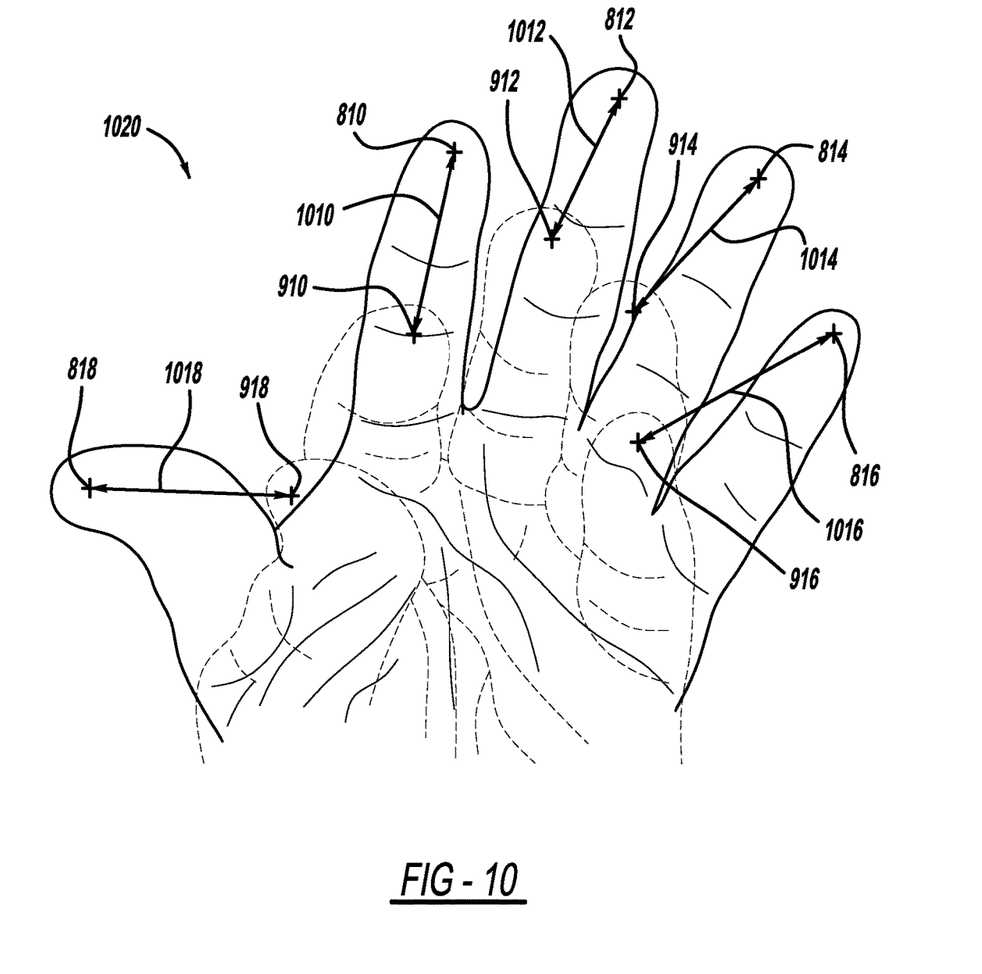
FIG. 10. Is illustration of the finger path and gesture formed by the user in FIG. 8 and FIG. 9.

Now referring to FIG. 10, each of the initial and subsequent positions for each finger is used to determine a finger path for each corresponding finger. For example, an index finger path 1010, a middle finger path 1012, a ring finger path 1014, a pinky finger path 1016, and a thumb finger path 1018. Each of the finger paths as well as the position and orientations of each finger may be compared to various gesture models to determine a corresponding gesture 1020. Accordingly, the system may issue a command corresponding to the gesture based on one or more combinations of the position orientation and finger paths of each finger.

Figure 11:
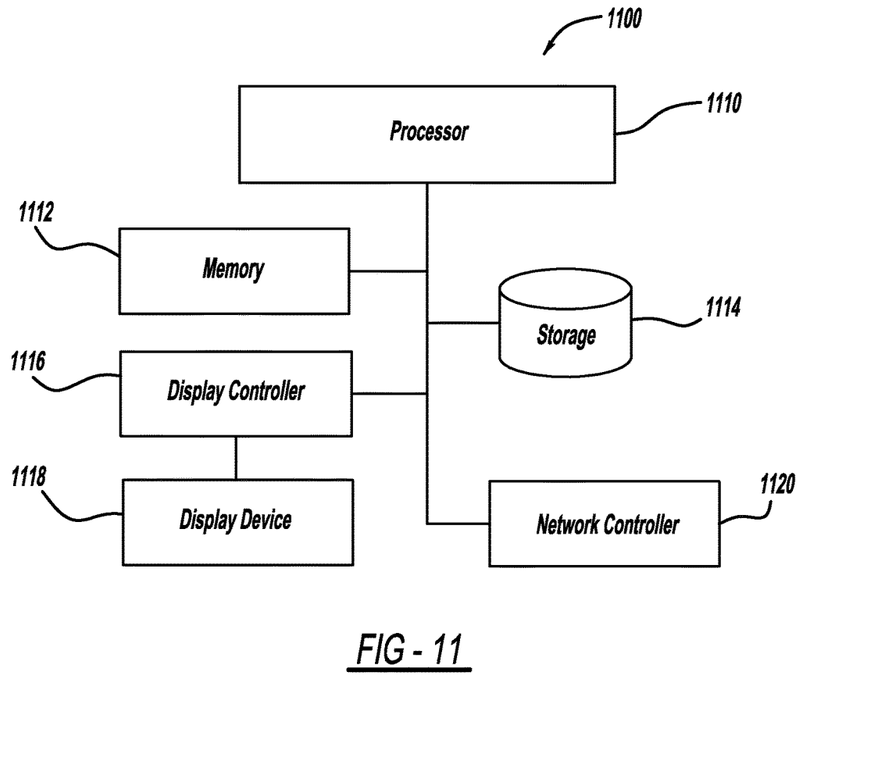
FIG. 11 is a schematic view of one implementation of a controller.

Any of the controllers, devices, modules, servers, or engines described may be implemented in one or more computer systems. One exemplary system is provided in FIG. 11. The computer system 1100 includes a processor 1110 for executing instructions such as those described in the methods discussed above. The instructions may be stored in a computer readable medium such as memory 1112 or storage devices 1114, for example a disk drive, CD, or DVD. The computer may include a display controller 1116 responsive to instructions to generate a textual or graphical display on a display device 1118, for example a computer monitor. In addition, the processor 1110 may communicate with a network controller 1120 to communicate data or instructions to other systems, for example other general computer systems. The network controller 1120 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

I claim:

1. A system for receiving input from a user of a vehicle, the system comprising:
   a first camera configured to selectively capture a first image being an image of a background;
   the first camera additionally configured to selectively capture a second image after the first image and including both background and an image of a finger print of a user's fingers and the user's hand,
   wherein the first camera is associated with a front console of the vehicle;
   a controller configured to
      display the second image of the user's hand,
      overlay graphics on the second image of the user's hand, and
   the controller coupled to the first camera and configured to
      subtract the first image from the overlaid second image to produce a difference image comprising an image of the finger prints of the user,
   the controller being additionally configured to
      compare the image of the finger prints to a stored pattern and
      determine from said comparison the identity of the fingers of the user,
   the controller being additionally configured to
      determine a three dimensional motion as a gesture of the fingers of the user's hand without the identified fingers touching any portion of the front console based on a model of the fingers by
         determining three-dimensional finger paths from another image from another camera associated with the front console and from the second image; and
         matching the determined three-dimensional finger paths to a predetermined model of finger paths to
      determine a gesture based on the determined three dimensional motion without the identified fingers touching any portion of the front console, and
      control a device based on the determined gesture.

2. A system for receiving input from a user of a vehicle, the system comprising:
   a first camera configured to selectively capture a first image of a background;
   the first camera configured to selectively
      capture a second image after the first image and including both
         background and
         an image of finger prints of a user's fingers of the user's hand;
   wherein the first camera is associated with a front console of the vehicle; and
   a controller coupled to the first camera and configured
      to subtract the first image from the second image
      to produce a difference image comprising an image of the finger prints of the user,
   the controller being additionally configured to
      compare the image of the finger prints to stored patterns and
      determine from said comparison the identity of the fingers of the user,
   the controller being additionally configured to
      determine the location of the identified fingers of the user within a field of view of the first camera,
   the controller being additionally configured to
      determine a three dimensional motion as a gesture of the fingers of the user's hand without the identified fingers touching any portion of the front console based on
      using a model of the finger prints in three dimensional space to
      determine positions of at least two of the identified fingers relative to one another in the first image from the first camera and a successive image from another camera based on triangulation; and
      determine, based on
         the determined positions and
         the identified fingers
            three-dimensional finger paths; and
      match the determined three-dimensional finger paths to a predetermined model of finger paths to
      determine a gesture based on the determined three dimensional motion without the fingers touching any portion of the front console, and
      control a device based on the determined gesture.

3. The system according to claim 2, wherein the controller is configured to determine the positions of the at least two identified fingers on the hand by first generating an average of a plurality of background images that do not include the hand and thereafter calculating a difference between each image in the successive series of images that include the hand and captured images of the finger prints of the at least two fingers.

4. A system for receiving input command gestures from a user in a vehicle, the system comprising:
   at least one camera located in the vehicle and associated with a front console of the vehicle and configured to
      receive a first series of images of a background obtained from inside the vehicle and,
      after the at least one camera receives the first series of images of background, receive a second image of finger prints of a user's fingers and the user's hand captured in the first series of images; and
   a controller configured to
      average the first series of images of the background received by the at least one camera captured prior to capturing the second image received by the at least one camera and to
      subtract the average of the first series of images of the background from the second image to
      produce an image of the finger prints of the user's finger,
   the controller additionally configured to
      display the second image of the user's hand,
      overlay graphics on the second image of the user's hand, and
      determine the identity of the user's fingers by
         comparing the second image of the finger prints of the user's finger to a stored pattern of finger prints and
      issue a command based on
         whether the second image of the finger prints of the user's fingers matches the stored pattern of finger prints,
   the controller being additionally configured to
      determine a three dimensional motion as a gesture of the identified fingers of the user's hand without the identified fingers touching any portion of the front console based on
         determining three-dimensional finger paths from one image of the first series of images and one image from a second series of images from another camera associated with the front console of the vehicle;
         matching the determined three-dimensional finger paths to a predetermined model of finger paths to
      determine a gesture based on the determined three dimensional motion without the identified fingers touching any portion of the front console, and
      control a device based on the determined gesture.

5. The system according to claim 4, wherein the controller is configured to determine a position of one of more fingers of the user's fingers in an image.

6. The system according to claim 5, further comprising a display screen in the vehicle, and wherein the at least one camera is a plurality of cameras located in predetermined positions on the front console, each camera being configured and located to capture a series of images of finger prints, the controller being configured to identify a plurality of positions of the one or more fingers responsive to a determination that a plurality of images of the finger prints of one or more fingers match stored patterns of finger prints.

7. The system according to claim 6, wherein the controller is configured to analyze each series of images to identify positions of the one or more fingers in three dimensional space.

8. The system according to claim 6, wherein the controller is configured to determine the positions of at least two fingers relative to one another.

9. The system according to claim 4, wherein the controller is configured to determine a plurality of positions of at least one finger of the user's fingers in each image of a series of images to determine a finger path.

10. The system according to claim 4, wherein the controller is configured to determine a plurality of positions of at least two fingers of the user's fingers relative to one another in each image of a series of images to determine a gesture based on a plurality of finger paths of the at least two fingers in three dimensional space.

11. The system according to claim 4, wherein the controller is configured to determine a plurality of positions of at least two fingers relative to one another in each one image based on triangulation and a position and orientation of each camera.

12. The system according to claim 4, wherein the controller is configured to determine a plurality of positions of at least two fingers of the user's fingers by generating an average of a plurality of background images and calculating a difference between each image of a series of images and the average of the plurality of background images.

13. The system according to claim 4, wherein the controller is configured to match a stored model of a finger print to a finger print on at least one of the fingers.

14. A method for receiving a touchless input to a system in a vehicle, from a user inside the vehicle, the method comprising:
   capturing a series of images of a background, the series of images being captured by a first camera inside the vehicle and associated with a front console of the vehicle;
   averaging the series of captured images of the background;
   after the series of captured images of the background are averaged,
      capture an image of the user's hand viewed by the first camera,
      overlay graphics on the captured image of the user's hand viewed by the first camera, and
      capturing based on the overlaid image a plurality of images of
         finger prints of the user's fingers,
         the user's hand, and
         background
            with the first camera;
   subtracting the average of the series of captured images of the background from the plurality of captured images of the finger prints of the user's fingers and the background to
   produce a plurality of difference images of the finger prints of the user's fingers;
   analyzing the plurality of difference images of the finger prints of the user's fingers to
   identify fingers
   determining a gesture made in three dimensional space by
      determining movement of the hand without the identified fingers touching any portion of the front console based on
         using a predetermined model of finger paths of the identified fingers by determining three-dimensional finger paths from another image from another camera and from one image of the plurality of captured images; and matching the determined three-dimensional finger paths to the predetermined model of finger paths to determine the gesture based on the determined movement of the hand without the identified fingers touching any portion of the front console; and issuing a command to the system in the vehicle to control a device based on the determined gesture.

15. The method according to claim 14, wherein the series of images include at least one image of a plurality of images captured by a plurality of cameras on a front console of a vehicle.

16. The method according to claim 14, further comprising determining a plurality of positions of at least one finger of the user's fingers in each image of a series of images to determine a finger path.

17. The method according to claim 16, further comprising determining a plurality of positions of at least two fingers relative to one another in each image of the series of images to determine finger paths to determine a gesture based on each finger path of the at least two fingers in three dimensional space.

18. The method according to claim 17, further comprising determining the positions of the at least two fingers relative to one another in each image based on triangulation and a position and orientation of each camera.

19. The method according to claim 18, further comprising determining the positions of the at least two fingers by generating an average of a plurality of background images and calculating a difference between each image in a series of images and the average of the plurality of background images.

* * * * *